(12) United States Patent
Asano et al.

(10) Patent No.: US 10,566,859 B2
(45) Date of Patent: Feb. 18, 2020

(54) ROTOR

(71) Applicant: DAIKIN INDUSTRIES, LTD., Osaka-Shi, Osaka (JP)

(72) Inventors: Yoshinari Asano, Osaka (JP); Yoshiki Yasuda, Osaka (JP); Masaki Hirano, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 10 days.

(21) Appl. No.: 15/759,281

(22) PCT Filed: Sep. 27, 2016

(86) PCT No.: PCT/JP2016/078329
§ 371 (c)(1),
(2) Date: Mar. 12, 2018

(87) PCT Pub. No.: WO2017/057302
PCT Pub. Date: Apr. 6, 2017

(65) Prior Publication Data
US 2018/0183285 A1    Jun. 28, 2018

(30) Foreign Application Priority Data

Sep. 29, 2015  (JP) .................................. 2015-190859

(51) Int. Cl.
| | |
|---|---|
| *H02K 1/27* | (2006.01) |
| *H02K 21/14* | (2006.01) |
| *H02K 15/03* | (2006.01) |
| *H02K 29/03* | (2006.01) |

(52) U.S. Cl.
CPC ............... *H02K 1/27* (2013.01); *H02K 15/03* (2013.01); *H02K 21/14* (2013.01); *H02K 29/03* (2013.01)

(58) Field of Classification Search
CPC ........ H02K 1/27; H02K 1/2766; H02K 15/03; H02K 21/14; H02K 29/03
USPC ........................................ 310/156.53, 156.56
See application file for complete search history.

(56) References Cited

U.S. PATENT DOCUMENTS

| | | | |
|---|---|---|---|
| 6,225,724 B1 | 5/2001 | Toide et al. | |
| 2010/0301697 A1 | 12/2010 | Takahashi et al. | |
| 2014/0210296 A1 | 7/2014 | Miyashita | |

FOREIGN PATENT DOCUMENTS

| | | |
|---|---|---|
| CN | 101855808 A | 10/2010 |
| EP | 2099114 A2 | 9/2009 |
| EP | 2680403 A2 | 1/2014 |
| JP | 2006-254598 A | 9/2006 |
| JP | 2009-50099 A | 3/2009 |
| WO | WO 2012/038377 A2 | 3/2012 |
| WO | WO 2013/103118 A1 | 7/2013 |

OTHER PUBLICATIONS

International Search Report (PCT/ISA/210) issued in PCT/JP2016/078329, dated Dec. 20, 2016.

*Primary Examiner* — Terrance L Kenerly
(74) *Attorney, Agent, or Firm* — Birch, Stewart, Kolasch & Birch, LLP

(57) ABSTRACT

A rotor includes a rotor core and a bond magnet. The rotor core has core blocks and a partition core sandwiched between the core blocks in an axial direction. Magnet holes pass through the core blocks and the partition core in the axial direction, respectively, and the magnet hole is communicated with the magnet holes. Positions of the magnet holes in a circumferential direction are deviated from each other. The bond magnet fills the magnet holes.

8 Claims, 6 Drawing Sheets

ROTOR

TECHNICAL FIELD

The present invention relates to a rotor used for a rotary electrical machine.

BACKGROUND ART

Conventionally, various kinds of rotary electrical machines each including an annular stator around a round columnar rotor have been developed. The rotor includes a rotor core in which a plurality of core sheets made up of magnetic steel plates are laminated, a magnet hole formed in the rotor core, and a magnet embedded in the magnet hole.

In order to reduce noise generated in rotating the rotor, Japanese Patent Application Laid-Open No. 2006-254598 described below discloses a rotor in which the magnet hole is deviated (skewed) in a circumferential direction of the rotor (that is to say, a circumferential direction with respect to a rotational axis) as the magnet hole gets closer from one end in a direction parallel to a rotational axis of the rotor (referred to as "the axial direction" hereinafter) toward the other end.

The rotor in which the magnet hole is skewed has a magnetic pole center moving in the circumferential direction from the one end in the axial direction of the rotor toward the other end. Accordingly, variation in reluctance and a gradual change in magnetomotive force caused by a rotational position of the rotor are reduced. The above configuration reduces a cogging torque and a torque ripple, and the noise is reduced. There are cases where the skew is performed on each one core sheet and the skew is performed in stages by the plurality of core sheets (step skew).

In the rotor to which the step skew is applied, a non-magnetic body is disposed on a boundary at which the magnet hole is skewed to prevent leakage flux. When a bond magnet is injection-molded in the magnet hole, the bond magnet is preferably formed with a single injection molding. It is therefore necessary to also provide the non-magnetic body described above with the magnet hole. The bond magnet is formed in each magnet hole of the core sheet and the non-magnetic body.

However, a portion of the non-magnetic body is not influenced by a magnetic field, and a magnetic pole cannot be formed on an outer periphery thereof. Thus, the bond magnet formed in the magnet hole in the non-magnetic body cannot contribute to the torque of the rotor.

SUMMARY

Problem to be Solved by the Invention

It is an object of the present invention to provide a rotor in which a magnet which cannot contribute to a torque is reduced.

Means to Solve the Problem

A rotor (10; 40) according to the present invention includes a rotor core (24; 44) and a bond magnet (26). The rotor core has a first core block (14a; 14b), a second core block (14b; 14c), and a partition core (20d; 20e) being sandwiched between the first core block and the second core block in an axial direction being parallel to a rotational axis (J) of the rotor. Both the first core block and the second core block include lamination layers of a plurality of first core sheets (12) made up of magnetic steel plates laminated along the axial direction. The partition core includes one second core sheet (18) or lamination layers of a plurality of second core sheets (18), the one or plurality of second core sheets (18) being made up of magnetic steel plates laminated along the axial direction. A first magnet hole (16a; 16b) passes through the first core block along the axial direction. A second magnet hole (16b; 16c) passes through the second core block along the axial direction. A third magnet hole (22d; 22e) being communicated with the first magnet hole and the second magnet hole passes through the partition core along the axial direction. Positions of the first magnet hole, the second magnet hole, and the third magnet hole are deviated from each other in a circumferential direction (K) with respect to the rotational axis. The bond magnet fills the first magnet hole, the second magnet hole, and the third magnet hole.

For example, when seen along the axial direction, a first surface (16an) of the first magnet hole (16a) located on an opposite side of the rotational axis (J) does not intersect with a second surface (16bs) of the second magnet hole (16b) located on a side common to the rotational axis but intersects with a third surface (16bn) of the second magnet hole located on an opposite side of the rotational axis, and a fourth surface (16as) of the first magnet hole located on a side common to the rotational axis (J) does not intersect with the third surface but intersects with the second surface.

For example, a shape of the third magnet hole (22d) projected on a planar surface being orthogonal to the axial direction is identical with a shape of overlapping a shape of the first magnet hole (16a) projected on the planar surface and a shape of the second magnet hole (16b) projected on the planar surface.

For example, in a region where the first surface (16an) is located between the second surface (16bs) and the third surface (16bn) when seen along the axial direction, a thickness t of the partition core (22d) is equal to or larger than $\{d(2w-d)\}^{1/2}$, where a width of the second magnet hole (16b) is indicated by w, a maximum value of a distance from the first surface to the third surface is indicated by d.

For example, a plurality of the first magnet holes (16a; 16b), the second magnet holes (16b; 16c), and the third magnet holes (22d; 22e) are provided, and one of the second magnet holes being communicated through one of the first magnet hole with one of the third magnet holes is not communicated with another one of the first magnet holes.

For example, a portion (30) facing the second core block (14b) in the bond magnet (26d) embedded in the third magnet hole (22d) is magnetized in the axial direction.

For example, the bond magnet has anisotropy.

Effects of the Invention

The second core sheet forming the partition core is the magnetic steel plate, thus is not a non-magnetic body as is a conventional case. The rotor magnetic pole is also disposed in the portion of the partition core by the magnetic flux of the bond magnet filling the third magnet hole. Thus, a magnet, in the conventional rotor, which does not contribute to a torque is reduced.

For example, the partition core is also hardly influenced by the demagnetization in accordance with the shape limited by the width w described above, thus the required magnetic flux is also obtained in the partition core easily. For example, the bond magnet having anisotropy is used, thus a magnetic flux concentration is increased compared with a bond magnet having isotropy.

These and other objects, features, aspects and advantages of the present invention will become more apparent from the following detailed description of the present invention when taken in conjunction with the accompanying drawings.

DESCRIPTION OF EMBODIMENT(S)

A rotor according to the present embodiment is described using the drawings. The rotor is used for a rotary electrical machine, for example, an IPM (Interior Permanent Magnet) motor. The rotary electrical machine can be applied to a compression machine, for example, as is the case with a conventional rotary electrical machine.

Figure 1:
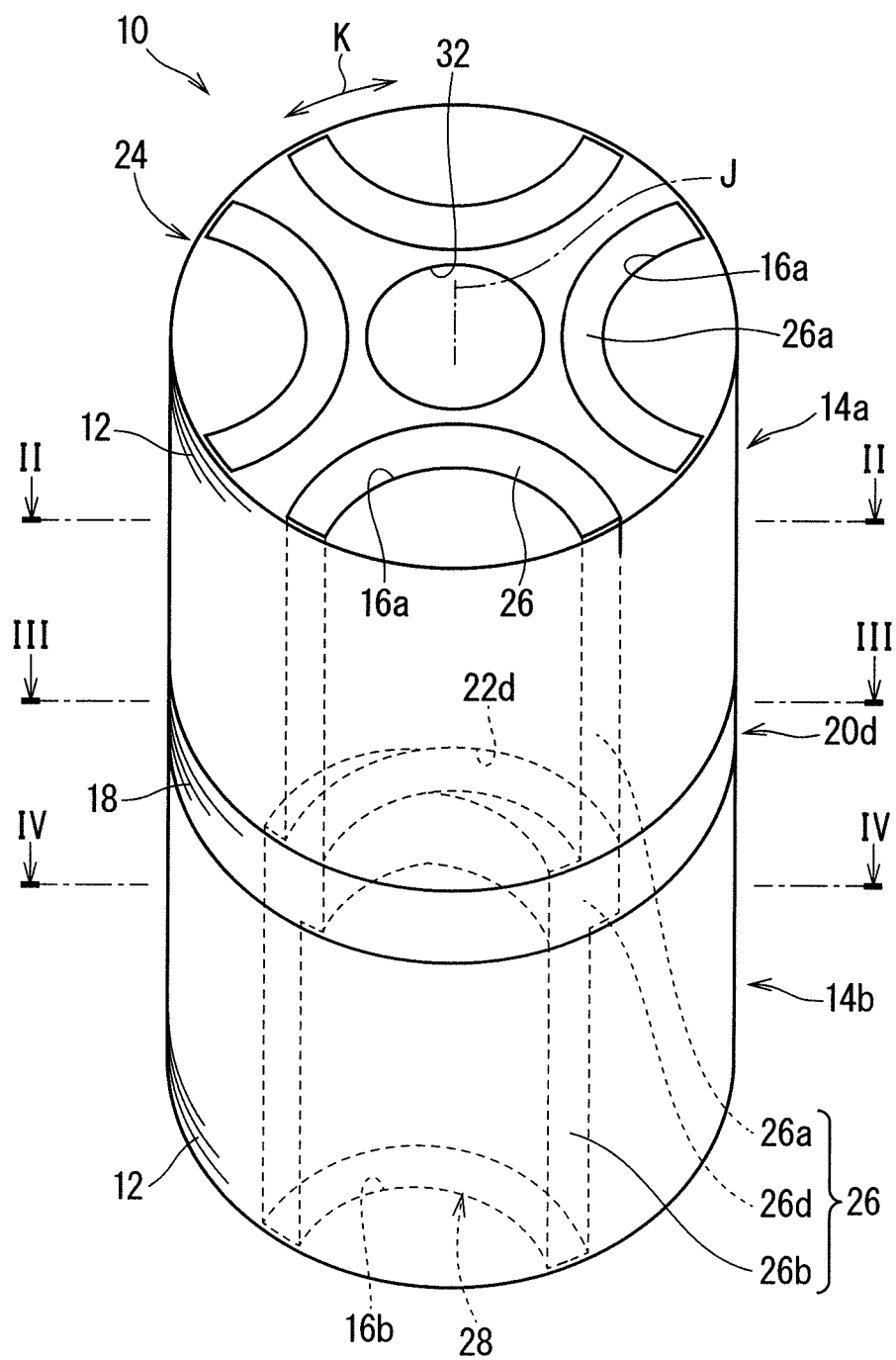
FIG. 1 is a perspective view illustrating a rotor of the present invention.

FIG. 1 illustrates a perspective view of a rotor 10 according to the present embodiment. The rotor 10 includes a rotor core 24 and a bond magnet 26. The rotor core 24 has two core blocks 14a and 14b in which a plurality of first core sheets 12 are laminated and a partition core 20d. A direction in which the first core sheets 12 are laminated is a thickness direction of each first core sheet 12, and also is an axial direction parallel to a rotational axis J of the rotor 10. The partition core 20d is sandwiched between the core blocks 14a and 14b in the axial direction.

A magnet hole 16a, a magnet hole 16b, and a magnet hole 22d pass through the core block 14a, the core block 14b, and the partition core 20d, respectively, in the axial direction. One magnet hole 22d is communicated with one magnet hole 16a and one magnet hole 16b. One group of these three magnet holes 16a, 16b, and 22d being communicated with each other constitutes one magnet hole 28.

The bond magnet 26 fills the magnet hole 28. Particularly, the bond magnet 26 has bond magnets 26a, 26b, and 26d which fill the magnet holes 16a, 16b, and 22d, respectively. Although a total number of magnet holes 28 is optionally set, the bond magnet 26 is filled so that north pole and south pole are alternately formed on an outer periphery of the rotor core 24.

A through hole is provided in the first core sheet 12. The through hole achieves the magnet holes 16a and 16b by laminating the first core sheet 12. The rotor 10 is provided with four magnet holes 16a in the core block 14a and four magnet holes 16b in the core block 14b.

The partition core 20d is made up of a second core sheet 18. A total number of second core sheets 18 used in the partition core 20d may be one, or a plurality of second core sheets 18 are laminated in the axial direction in some cases. A through hole is provided in the second core sheet 18. When the partition core 20d includes the one second core sheet 18, the through hole functions as the magnet hole 22d.

When the partition core 20d includes the plurality of laminated second core sheets 18, the through holes in the second core sheets 18 achieve the magnet hole 22d. The magnet holes 22d being the same in number as the magnet holes 16a and 16b are provided, and a case where the number thereof is four is illustrated as an example herein.

The first core sheet 12 and the second core sheet 18 can be obtained by punching an magnetic steel plate of a soft magnetic body to form a shape. Each of the first core sheet 12 and the second core sheet 18 has a thickness of approximately 0.2 to 1 mm, for example, and preferably has a thickness of approximately 0.3 to 0.5 mm. An insulating film is coated on a surface of each of the first core sheet 12 and the second core sheet 18 to prevent eddy current between the laminated first core sheets 12 and between the laminated second core sheets 18. An outer peripheral shape of each of the first core sheet 12 and the second core sheet 18 is circular or substantially circular.

The rotor core 24 has a cylindrical shape as a whole. Since the partition core 20d is sandwiched between the core block 14a and the core block 14b, the core blocks 14a and 14b are disposed on both ends of the rotor core 24 in the axial direction.

Figure 2:
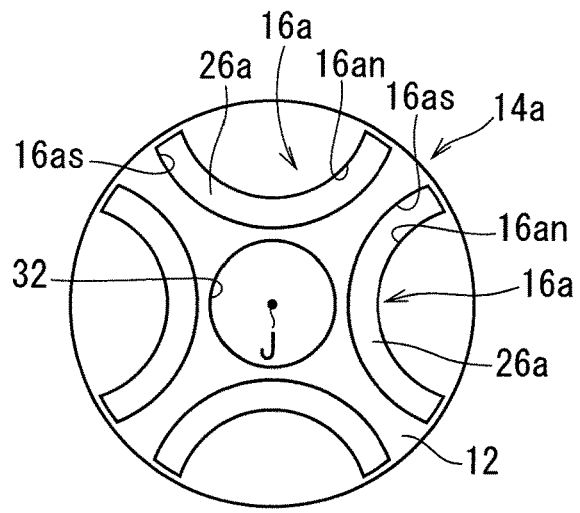
FIG. 2 is a cross-sectional view of the rotor in a position II-II in FIG. 1.
Figure 3:
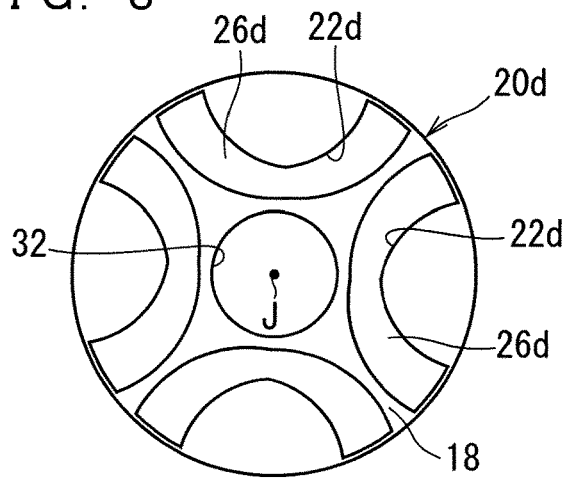
FIG. 3 is a cross-sectional view of the rotor in a position III-III in FIG. 1.
Figure 4:
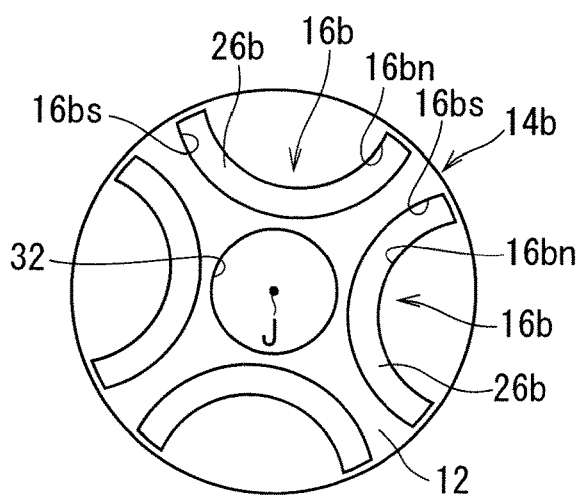
FIG. 4 is a cross-sectional view of the rotor in a position IV-IV in FIG. 1.

FIG. 2, FIG. 3, and FIG. 4 are cross-sectional views of the rotor 10 in positions II-II, III-III, and IV-IV in FIG. 1, respectively, perpendicular to the axial direction. In these drawings, the axial direction is perpendicular to sheets of the drawings. The positions II-II, III-III, and IV-IV indicate positions of the core block 14a, the partition core 20d, and the core block 14b, respectively, in the axial direction.

A step skew is provided in the rotor core 24. A position of the magnet hole 16a in a circumferential direction K is fixed in the core block 14a, a position of the magnet hole 16b in the circumferential direction K is fixed in the core block 14b, and a position of the magnet hole 22d in the circumferential direction K is fixed in the partition core 20d. The positions of one magnet hole 22d, the magnet hole 16a being communicated with the magnet hole 22d, and the magnet hole 16b being communicated with the magnet hole 22d are deviated from each other in the circumferential direction K. The position of the rotor core 24 in the circumferential direction K is aligned in FIG. 2, FIG. 3, and FIG. 4 to clarify the step skew.

Figure 5:
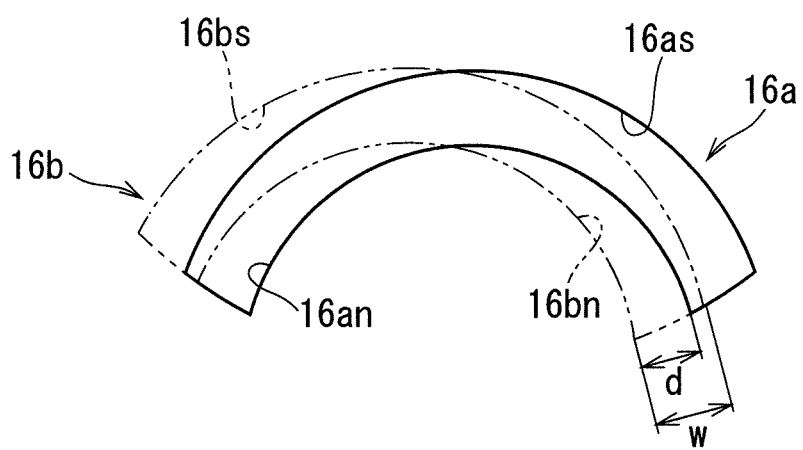
FIG. 5 is planar view illustrating magnetic holes in two core blocks overlapping with each other.
Figure 6:
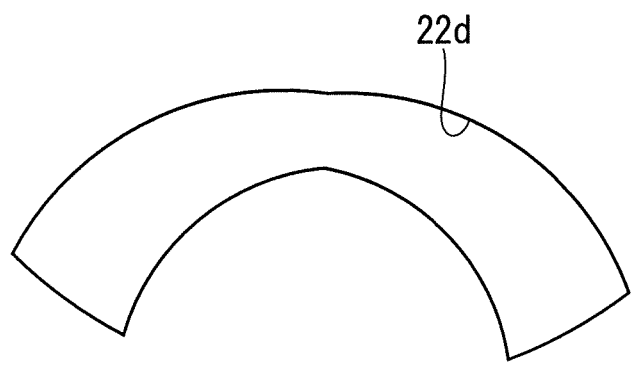
FIG. 6 is a planar view illustrating a magnetic hole in a partition core.

FIG. 5 is a planar view illustrating the magnetic holes 16a and 16b, both of which are communicated with one same magnet hole 22d, in an overlapping manner, seen along the axial direction. FIG. 6 is a planar view illustrating the one magnetic hole 22d seen along the axial direction. In both FIG. 5 and FIG. 6, the axial direction is perpendicular to sheets of the drawings. A shape of the magnet hole 22d projected on a planar surface being orthogonal to the axial direction is the same as a shape of overlapping a shape of the magnet hole 16a projected on the planar surface and a shape of the magnet hole 16b projected on the planar surface.

With reference to FIG. 2, FIG. 3, and FIG. 4, the magnet hole 16a has a surface 16as on a side common to the rotational axis J and a surface 16an on an opposite side of the rotational axis J, and the magnet hole 16b has a surface 16*bs* on a side common to the rotational axis J and a surface 16*bn* on an opposite side of the rotational axis J. When there is a positional relationship between the surfaces 16*as*, 16*an*, 16*bs*, and 16*bn* described below when seen along the axial direction, an outer periphery of the magnet hole 22*d* coincides with a portion which is located outermost when the magnet hole 16*a* and the magnetic hole 16*b*, both of which are communicated with the magnet hole 22*d*, are overlapped with each other (refer to FIG. 5 and FIG. 6); the surface 16*an* does not intersect with the surface 16*bs* but intersects with the surface 16*bn*, and the surface 16*as* does not intersect with the surface 16*bn* but intersects with the surface 16*bs*.

The bond magnet 26 is formed by filling the magnet hole 28 with a magnetic material by injection molding and then magnetizing the magnetic material, for example. A bond magnet having anisotropy is used for the bond magnet 26. The magnetic material is made up of a binder resin into which a magnetic powder or magnetic particles are mixed. The binder resin is, for example, polyamide, polybutylene terephthalate, polyethylene terephthalate, polyphenylene sulfide, or liquid crystal polymer. Examples of the magnetic powder or the magnetic particles include a magnetic power or magnetic particles that include neodymium having anisotropy such as NdFeB, for example. Not only the magnetic powder or the magnetic particles of NdFeB but also a magnetic powder or magnetic particles of SmFeN may also be mixed and used.

A plurality of magnet holes 28 are provided. However, the magnet hole 16*a* in which one bond magnet 26 is embedded does not overlap with the magnet hole 16*b* in which the other bond magnet 26 is embedded when seen from a direction in which the first core sheets 12 in the two core blocks 14*a* and 14*b*, which sandwich the partition core 20*d*, are laminated. Accordingly, one magnet hole 28 and the other magnet hole 28 are not communicated with each other.

The same applies to a case where the plurality of magnet holes 16*a*, the plurality of magnet holes 16*b*, and the plurality of magnet holes 22*d* are provided in the core block 14*a*, the core block 14*b*, and the partition core 20*d*, respectively, in the radial direction of the rotational axis J. That is to say, one magnet hole 16*b* being communicated with one magnetic hole 16*a* through one magnetic hole 22*d* is not communicated with the other magnetic hole 16*a*.

Figure 7:
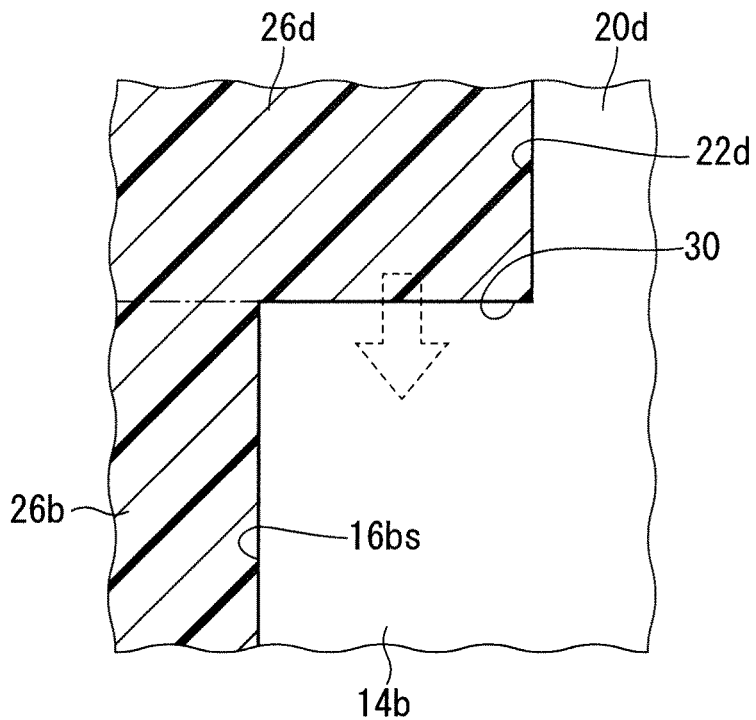
FIG. 7 is a cross-sectional view illustrating a direction of magnetization of a bond magnet in the magnetic hole in the partition core.

FIG. 7 is a cross-sectional view illustrating a direction of magnetization of the bond magnet 26*d* in the magnetic hole 22*d*. A portion 30 facing the core block 14*b* in the bond magnet 26*d* embedded in the magnet hole 22*d* is magnetized in the axial direction. The bond magnet 26 is not magnetized alone, but is magnetized in a state where the bond magnet 26 is injected into the rotor core 24. Thus, when the magnetic material is magnetized, the direction of magnetization is directed to a direction perpendicular to the core block 14*b* contacting the magnetic material. When the bond magnet 26 has anisotropy, magnetic field is applied at a time of the injection molding of the magnetic material, which is adopted for forming the bond magnet 26, to generate the magnetization in the direction perpendicular to the core block 14*b*.

Figure 8:
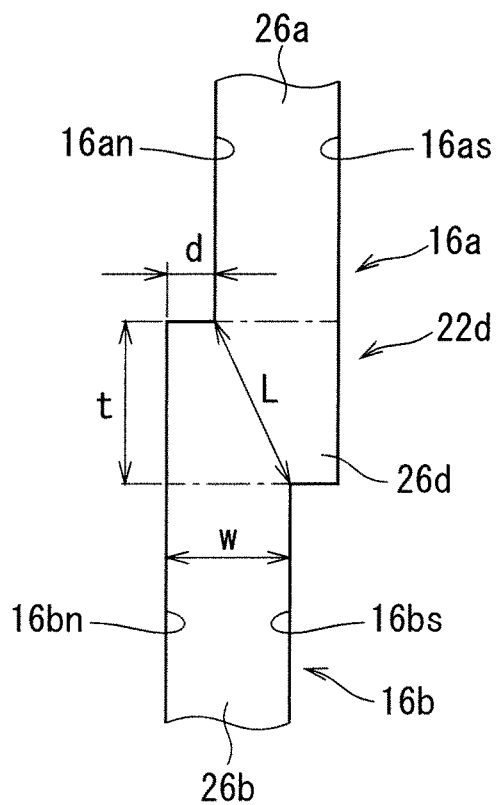
FIG. 8 is a cross-sectional view illustrating a relationship of shapes of the magnets in the magnetic holes in the two core blocks and the magnet hole in the partition core.

FIG. 8 is a cross-sectional view illustrating a relationship of shapes of the bond magnets 26*a*, 26*b*, and 26*d* in the magnetic holes 16*a*, 16*b*, and 22*d* being communicated with each other. FIG. 8 illustrates a cross section parallel to the axial direction in a position in a region described below, and the axial direction is adopted to a vertical direction of FIG. 8: a region where the surface 16*an* is located between the surface 16*bs* and the surface 16*bn* when seen along the axial direction (also referred to as FIG. 5).

A width of the magnet hole 16*b* is indicated by w, a maximum value of a deviation between the magnet hole 16*b* and the magnet hole 16*a* (a distance from the surface 16*an* to the surface 16*bn* in the region) is indicated by d, and a thickness of the partition core 20*d* is indicated by t. In FIG. 5, since both the magnet holes 16*a* and 16*b* have an arc-like shape being convex toward the rotational axis J (also refer to FIG. 1 to FIG. 4), the maximum value d is obtained between the ends of the surfaces 16*an* and 16*bn*. In the region, d<w is satisfied.

Considering the cross section in FIG. 8, a magnitude of demagnetization in the bond magnet 26*d* is determined by a distance L from an end of the surface 16*an* on a side of the magnet hole 22*d* in the axial direction to an end of the surface 16*bs* on the side of the magnet hole 22*d* in the axial direction. $L=\{(w-d)^2+t^2\}^{1/2}$, is satisfied.

A magnitude of demagnetization in the bond magnet 26*b* is determined by a width w. The bond magnet 26*b* is demagnetized more easily with a decreasing width w, and a desired magnetic flux cannot be obtained easily. Accordingly, the width w is preferably larger than a thickness with which a required magnetic flux is obtained from the bond magnet 26*b*. The same applies to the distance L, and when L w is satisfied, the required magnetic flux can also be obtained easily from the bond magnet 26*d*. That is to say, the partition core 20*d* preferably have the thickness t equal to or larger than $\{d(2w-d)\}^{1/2}$. Furthermore, a greater number of magnets are used compared with a case where the present invention is not adopted, however, a magnetic pole area in accordance with the number of magnets can be obtained, thus the thickness of the whole rotor core 24 in the axial direction can be even reduced in the axial direction.

Figure 9:
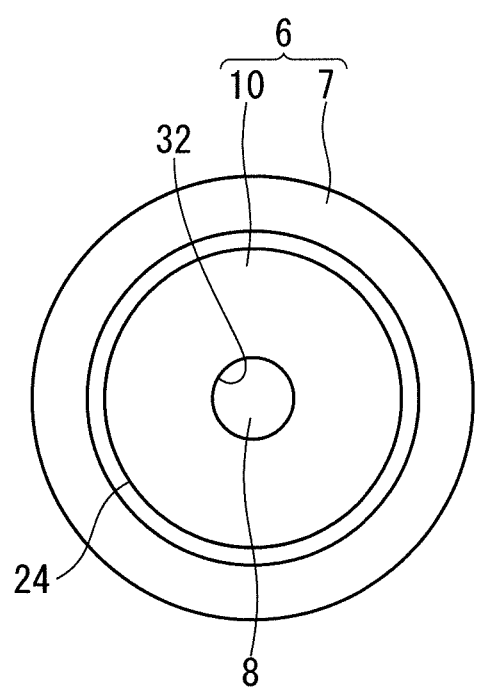
FIG. 9 is a cross-sectional view illustrating a rotary electrical machine.

FIG. 9 is a cross-sectional view illustrating a rotary electrical machine 6 using the rotor 10 and a stator 7, and illustrates a cross section perpendicular in the axial direction. A detailed configuration on both the rotor 10 and the stator 7 is omitted to simplify the drawings. Also with reference to FIG. 1, a rotational axis hole 32 is provided in a center of the rotor core 24. A rotational shaft 8 is inserted into and fixed to the rotational axis hole 32. When the rotary electrical machine 6 is applied to a compression machine, the rotational shaft 8 extends to a compression mechanism (not shown in the drawings), and also functions as a rotational shaft of the compression machine. The stator 7 is disposed to surround a side of outer portion of the rotor 10, accordingly the rotor core 24, in the radial direction. The stator 7 has a coil (not shown in the drawings), and the rotor 10 is rotated by the magnetic field generated by flowing current in the coil.

The core blocks 14*a* and 14*b* and the partition core 20*d* are fixed to each other. For example, a fastening hole (not shown in the drawings) is provided in each of the first core sheet 12 and the second core sheet 18, and a fixing member (not shown in the drawings) is inserted into the fastening hole to fix the core blocks 14*a* and 14*b* and the partition core 20*d* to each other. For example, the fixing member is a bolt and a nut or a rivet, and the bolt or the rivet is fixed with a shaft thereof inserted in the fastening hole. The first core sheet 12 and the second core sheet 18 may also be fixed to each other by swaging.

Next, a method of manufacturing the rotor 10 is described. (1) A magnetic steel plate is prepared, and a processing of punching the magnetic steel plate ("punching processing") to have a predetermined shape is performed, thereby the first core sheet 12 and the second core sheet 18 are formed. Since the first core sheet 12 and the second core sheet 18 have the same outer shape, the punching processing may also be performed in separated processes to obtain the magnet holes 16a, 16b, and 22d after the outer shape being common to each other is formed.

As described above, the shape of the magnet hole 22d is the same as the shape of overlapping the projection of the magnet hole 16a and the projection of the magnet hole 16b located in positions deviated from each other along the circumferential direction K, for example. Accordingly, it is also applicable that a mold being common to the magnetic holes 16a and 16b is used to perform the punching processing on the second core sheet 18 twice. The second core sheet 18 is moved along the circumferential direction K between the first and second punching processing, thus the magnet hole 22d can be formed.

Since the rotational axis hole 32 and the fastening hole are necessary for the first core sheet 12 and the second core sheet 18, these holes are also formed by the punching processing.

(2) The rotor core 24 is formed. A method of forming the rotor core 24 includes (a) a predetermined number of first core sheets 12 are laminated to form the core block 14b, (b) a predetermined number of second core sheets 18 are laminated on the core block 14b to form the partition core 20d, and (c) a predetermined number of first core sheets 12 are laminated on the partition core 20d to form the core block 14a. The first core sheet 12 and the second core sheet 18 are laminated so that the partition core 20d is sandwiched between the core blocks 14a and 14b.

The two core blocks 14a and 14b sandwiching the partition core 20d are laminated so that the magnet holes 16a and 16b are deviated from each other in the circumferential direction K of the rotor core 24.

After the above (c), (b) and (c) are repeated as necessary to form the rotor core in which the required number of core blocks and partition cores are laminated.

It is also applicable that after the predetermined number of core blocks and partition cores are formed, the lamination is performed to sandwich the partition core by a pair of core blocks.

(3) Since the first core sheet 12 comes off the second core sheet 18 when the first core sheet 12 and the second core sheet 18 are only laminated, they are fixed with the fixing member described above. Furthermore, the rotational shaft 8 (refer to FIG. 9) is inserted into and fixed to the rotational axis hole 32.

(4) The magnet hole 28 is filled with the bond magnet 26. The filling of the bond magnet 26 is achieved by pouring the magnetic material described above into the magnet hole 28 by the injection molding, applying the magnetic field from outside to magnetize the magnetic material, and hardening the magnetic material poured into the magnet hole 28.

The rotor 10 is manufactured by the process described above. The rotor 10 is disposed inside the annular stator 7, and the rotary electrical machine 6 is obtained.

The second core sheet 18 forming the partition core 20d as described above is the magnetic steel plate, thus is not a non-magnetic body as is a conventional case. Thus, a magnet, in the conventional rotor, which does not contribute to a torque is reduced.

As described above, the shape which does not have the influence of demagnetization can also be obtained in the partition core 20d, thus the required magnetic flux can be also obtained from the partition core 20d. The bond magnet 26 can be integrally molded in one magnet hole 28, thus can be easily manufactured. The bond magnet 26 having anisotropy is used, thus a magnetic flux density can be increased compared with a bond magnet having isotropy. Since the magnet hole 28 is skewed, a cogging torque is reduced and a torque of the rotor is increased compared with a rotor which is not skewed.

The embodiment of the present invention is described above, however, the present invention is not limited to the above embodiment. For example, the shape of each of the magnet hole 16a and the magnet hole 16b seen along the axial direction is not limited to the arc-like shape, but may be a linear shape. The shape of the magnet hole 22d is also changed in accordance with the shapes of the magnet holes 16a and 16b.

Figure 10:
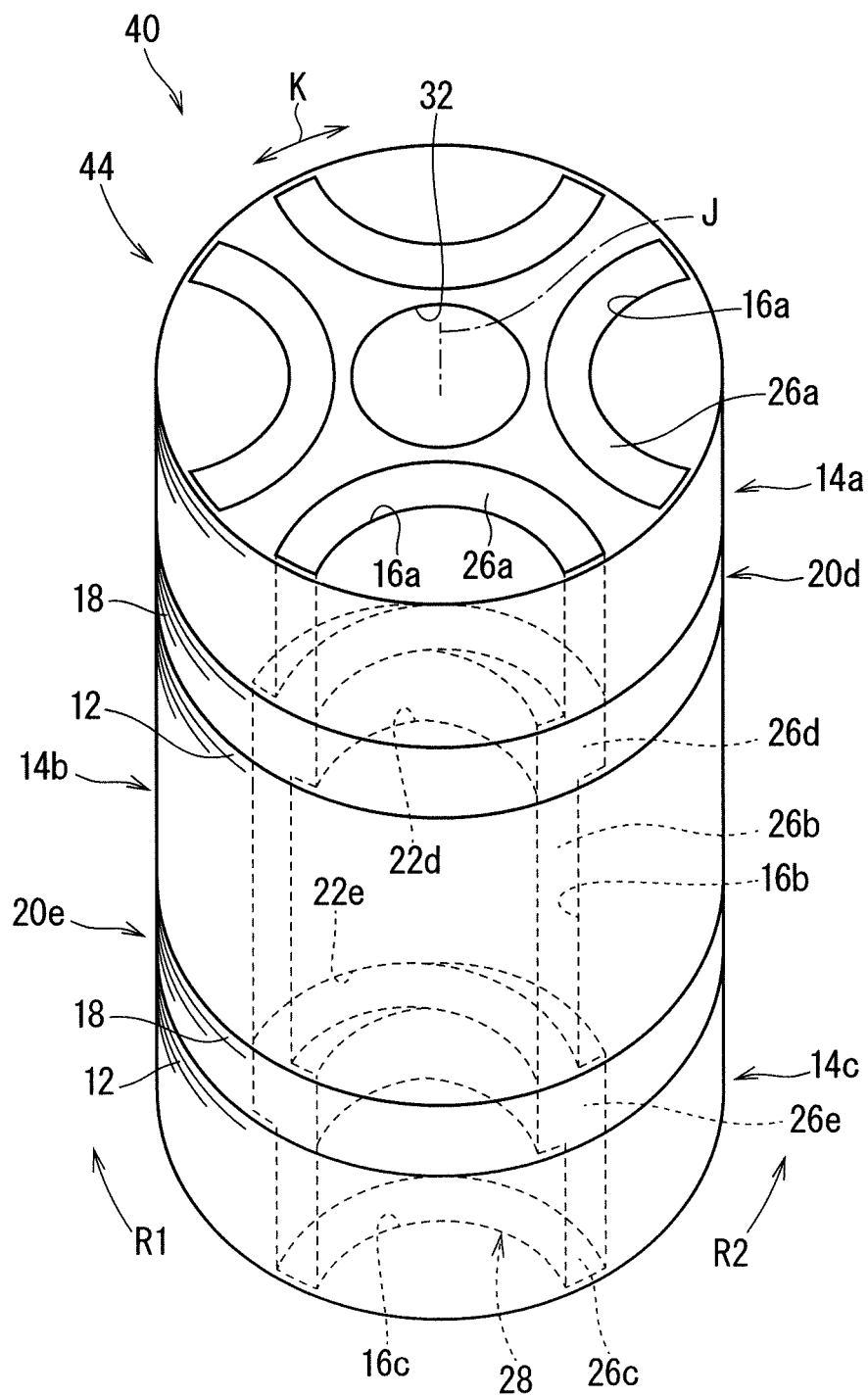
FIG. 10 is a perspective view illustrating a rotor in which a plurality of magnet holes are skewed in one direction and the other direction.

The number of core blocks may be three or more. In the above case, the direction of skewing the magnet hole is not limited to be constant. FIG. 10 is a perspective view illustrating the configuration of a rotor 40. The rotor 40 includes a rotor core 44 and bond magnets 26a, 26b, 26c, 26d, and 26e.

The rotor core 44 has three core blocks 14a, 14b, and 14c and two partition cores 20d and 20e. In the axial direction, the core blocks 14a and 14b and the core blocks 14b and 14c sandwich the partition core 20d and the partition core 20e, respectively.

The core block 14c and the partition core 20e are obtained in the manner similar to the core blocks 14a and 14b and the partition core 20d, respectively. The magnet hole 16c passes through the core block 14c in the axial direction, and the magnet hole 16c is filled with the bond magnet 26c. The magnet hole 22e passes through the core block 20e in the axial direction, and the magnet hole 22e is filled with the bond magnet 26e.

A positional relationship of the magnet hole 22e with the magnet holes 16b and 16c is similar to that of the magnet hole 22d with the magnet holes 16a and 16b except for the direction of the skew.

The magnet hole 16b is skewed in one direction R1 of the circumferential direction K with respect to the magnet hole 16a. The magnet hole 16c is skewed in the other direction R2 of the circumferential direction K with respect to the magnet hole 16b. That is to say, the magnet hole 28 is skewed in the one direction R1 and subsequently skewed in the other direction R2 while it goes from one end to the other end of the rotor core 44 in the axial direction. The direction of skewing the magnet holes 16a, 16b, and 16c is not limited.

Considered as a way of skewing the actual magnet hole 28 is that the magnet hole is deviated by half an angle of a cogging period of the rotary electrical machine. For example, in a case of a rotary electrical machine having four magnetic poles and six-slot with concentrated windings, each core block is laminated so that the magnet hole thereof is deviated by 15° about the rotational axis. The angle of deviating the magnet hole of the core block is equal to the angle between the one end and the other end of the rotor core along the axial direction.

For example, in the rotor core 24 in which the two core blocks 14a and 14b are provided, the core blocks 14a and 14b are laminated so that the magnet hole 16b is deviated from the magnet hole 16a by 15°. When the four core blocks are provided in the rotor core, the core blocks are laminated so that magnet hole of each core block is sequentially deviated by 5° along the axial direction in a case where the skew is performed in a determined direction.

When the magnet hole 28 is skewed in the one direction and the other direction as illustrated in FIG. 10, the magnet hole 16b is deviated from the magnet hole 16a by 15° in the one direction R1, and the magnet hole 16c is deviated from the magnet hole 16b by 15° in the other direction R2. When the magnet hole 28 is skewed in the one direction R1 and the other direction R2, a deviation amount needs to be 15° at a maximum in one magnet hole 28.

Both the rotor 10 illustrated in FIG. 1 and the rotor 40 illustrated in FIG. 10 are inner rotors (also refer to FIG. 9). However, the present application may also be applied to an outer rotor. Applied in the outer rotor is a rotor core in which at least one partition core and a plurality of core blocks sandwiching the partition core in an axial direction are laminated.

Moreover, the present invention can be implemented according to the embodiments applying various improvements, modifications, and variations based on knowledge of a skilled person within the scope of the present embodiment.

The present invention has been shown and described in detail, the foregoing description is in all aspects illustrative and not restrictive. It is therefore understood that numerous modifications and variations can be devised without departing from the scope of the invention.

The invention claimed is:

1. A rotor comprising a rotor core and a bond magnet, wherein
the rotor core includes:
a first core block;
a second core block; and
a partition core being sandwiched between the first core block and the second core block in an axial direction being parallel to a rotational axis of the rotor,
both the first core block and the second core block include lamination layers of a plurality of first core sheets made up of magnetic steel plates laminated along the axial direction,
the partition core includes one second core sheet or lamination layers of a plurality of second core sheets, the one or plurality of second core sheets being made up of magnetic steel plates laminated along the axial direction,
a first magnet hole passes through the first core block along the axial direction,
a second magnet hole passes through the second core block along the axial direction,
a third magnet hole being communicated with the first magnet hole and the second magnet hole passes through the partition core along the axial direction,
positions of the first magnet hole, the second magnet hole, and the third magnet hole are deviated from each other in a circumferential direction with respect to the rotational axis,
the bond magnet fills the first magnet hole, the second magnet hole, and the third magnet hole,
when seen along the axial direction,
a first surface of the first magnet hole located on an opposite side of the rotational axis does not intersect with a second surface of the second magnet hole located on a side common to the rotational axis but intersects with a third surface of the second magnet hole located on an opposite side of the rotational axis, and
a fourth surface of the first magnet hole located on a side common to the rotational axis does not intersect with the third surface but intersects with the second surface, and
a shape of the third magnet hole projected on a planar surface being orthogonal to the axial direction is identical with a shape of overlapping a shape of the first magnet hole projected on the planar surface and a shape of the second magnet hole projected on the planar surface.

2. The rotor according to claim 1, wherein
in a region where the first surface is located between the second surface and the third surface when seen along the axial direction, a thickness t of the partition core is equal to or larger than $\{d(2w-d)\}^{1/2}$, where a width of the second magnet hole is indicated by w, a maximum value of a distance from the first surface to the third surface is indicated by d.

3. The rotor according to claim 1, wherein
a plurality of the first magnet holes, the second magnet holes, and the third magnet holes are provided, and
one of the second magnet holes being communicated with one of the first magnet hole through one of the third magnet holes is not communicated with another one of the first magnet holes.

4. The rotor according to claim 2, wherein
a plurality of the first magnet holes, the second magnet holes, and the third magnet holes are provided, and
one of the second magnet holes being communicated with one of the first magnet hole through one of the third magnet holes is not communicated with another one of the first magnet holes.

5. The rotor according to claim 3, wherein
a portion facing the second core block in the bond magnet embedded in the third magnet hole is magnetized in the axial direction.

6. The rotor according to claim 4, wherein
a portion facing the second core block in the bond magnet embedded in the third magnet hole is magnetized in the axial direction.

7. The rotor according to claim 1, wherein
the bond magnet has anisotropy.

8. The rotor according to claim 2, wherein
the bond magnet has anisotropy.

* * * * *